United States Patent
Basnayake et al.

(10) Patent No.: US 8,447,519 B2
(45) Date of Patent: May 21, 2013

(54) METHOD OF AUGMENTING GPS OR GPS/SENSOR VEHICLE POSITIONING USING ADDITIONAL IN-VEHICLE VISION SENSORS

(75) Inventors: Chaminda Basnayake, Windsor (CA); Wende Zhang, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 217 days.

(21) Appl. No.: 12/943,247

(22) Filed: Nov. 10, 2010

(65) Prior Publication Data

US 2012/0116676 A1     May 10, 2012

(51) Int. Cl.
*G01C 21/10*     (2006.01)

(52) U.S. Cl.
USPC ........... 701/501; 701/445; 701/468; 701/469; 701/476; 701/478.5

(58) Field of Classification Search
None
See application file for complete search history.

(56) References Cited

U.S. PATENT DOCUMENTS

| | | | | |
|---|---|---|---|---|
| 5,638,116 A * | 6/1997 | Shimoura et al. | ............. | 348/118 |
| 5,745,868 A * | 4/1998 | Geier | ........................... | 701/472 |
| 5,983,161 A * | 11/1999 | Lemelson et al. | ........... | 701/301 |
| 6,502,033 B1 * | 12/2002 | Phuyal | ......................... | 701/445 |
| 7,299,057 B2 * | 11/2007 | Anderson | ................. | 455/456.1 |
| 7,369,924 B2 * | 5/2008 | Han et al. | ....................... | 701/28 |
| 7,502,688 B2 * | 3/2009 | Hirokawa | ..................... | 701/480 |
| 7,522,995 B2 * | 4/2009 | Nortrup | ........................ | 701/425 |
| 7,610,123 B2 * | 10/2009 | Han et al. | ....................... | 701/14 |
| 7,792,607 B2 * | 9/2010 | Han et al. | ....................... | 700/245 |
| 7,826,969 B2 * | 11/2010 | Hein et al. | ..................... | 701/429 |
| 7,844,077 B2 * | 11/2010 | Kochi et al. | ................... | 382/103 |
| 7,957,897 B2 * | 6/2011 | Basnayake | ..................... | 701/501 |
| 2006/0149472 A1 * | 7/2006 | Han et al. | ...................... | 701/214 |
| 2006/0190163 A1 * | 8/2006 | Anderson | ..................... | 701/201 |
| 2008/0154504 A1 * | 6/2008 | Hein et al. | .................... | 701/300 |
| 2009/0175498 A1 * | 7/2009 | Kochi et al. | ................... | 382/103 |
| 2009/0228204 A1 * | 9/2009 | Zavoli et al. | .................. | 701/208 |
| 2010/0017128 A1 * | 1/2010 | Zeng | ............................. | 701/301 |
| 2010/0217524 A1 * | 8/2010 | Oohashi et al. | ............... | 701/216 |
| 2011/0071755 A1 * | 3/2011 | Ishigami et al. | .............. | 701/208 |
| 2011/0301779 A1 * | 12/2011 | Shida | ................................ | 701/1 |

OTHER PUBLICATIONS

Davide Scaramuzza, et al, Appearance-Guided Monocular Omnidirectional Visual Odometry for Outdoor Ground Vehicles, IEEE Transactions on Robotics, vol. 24, No. 5, Oct. 2008, pp. 1015-1026.

(Continued)

*Primary Examiner* — Khoi Tran
*Assistant Examiner* — Jonathan L Sample

(57) ABSTRACT

A method is provided for augmenting GPS data using an in-vehicle vision-based module. A vehicle position is determined utilizing position-related data obtained from a position module. A position error is estimated on a periodic basis. A determination is made whether the position error estimate exceeds a first predetermined error threshold. Tracking data is generated for the vehicle over a course of travel utilizing captured images from the in-vehicle vision based module. The tracking data is integrated with the position-related data to estimate the vehicle position in response to the position error estimate exceeding the first predetermined error threshold. A determination is made whether the position error estimate decreases below a second predetermined error threshold. The vehicle position is re-determined using only the position-related data when the position error estimate decreases below the second predetermined error threshold.

23 Claims, 3 Drawing Sheets

OTHER PUBLICATIONS

Joakim Rydell, et al, Camera-based Navigation, Mapping and 3D Model Generation for Indoor Environments, ION 2010 International Technical Meeting, Jan. 25-27, 2010, San Diego, CA, pp. 148-152.

Dabid Nister, et al, Visual Odometry, Sarnoff Corporation, Princeton NJ, pp. 1-8, 2004.

* cited by examiner

METHOD OF AUGMENTING GPS OR GPS/SENSOR VEHICLE POSITIONING USING ADDITIONAL IN-VEHICLE VISION SENSORS

BACKGROUND OF INVENTION

An embodiment relates generally to GPS-assisted positioning.

Global Positioning System (GPS) or other Global Navigation Satellite System (GNSS) receivers operate by tracking line of sight signals. These receivers typically require at least four or more satellites to be continuously available in an unobstructed line of sight of a satellite receiver on a vehicle. Due to natural and man-made obstructions (e.g., buildings) or natural obstructions (i.e., dense tree cover), the theoretical minimum number of satellites required to accurately determine a position of the satellite receiver may not be available under certain conditions. When a vehicle GPS receiver looses communication with the respective satellites due to natural or man-made obstructions, other data such as that used for dead-reckoning positioning may be used to compensate for location error increase as a result of poor GPS accuracy. Generally, GPS combined systems output a position error estimate and the higher the error, the less reliable the estimated GPS position.

Inertial or other vehicle sensors such as yaw rate sensors may be used to generate GPS aiding data. Techniques used to aid GPS are generally capable of relative navigation (capture position and orientation change with respect to a given local starting point) whereas GPS is capable of providing absolute position information with respect to a global framework. Dead Reckoning (DR) is one example of such relative navigation techniques. One drawback utilizing yaw rate measurements or data from other such sensors is that pure integration over time without corrections or calibration accumulates sensor errors such as noise and bias in the sensors where the contamination of noise and bias depends largely on the quality of a sensor. As an example, while bias and noise level of typical yaw rate sensors may not be high for a short term application, the result is that the integration of the yaw rate sensor measurements is only valid for a few tens of seconds. Integration errors due to noise and bias grow quickly as time goes forward. Therefore, the integration process needs to be either reset and initialized or updated continuously. Therefore, the aid of using yaw sensors in the location estimation and location error estimate of the GPS system can only be utilized for short durations of time as a function of the sensor quality.

SUMMARY OF INVENTION

An advantage of an embodiment is the augmentation of tracking data used to correct errors in vehicle position data when GPS-related data is unavailable for updating the vehicle position. The tracking data is determined from an in-vehicle vision based module which determines yaw, pitch, and distance corrections from over a distance traveled by the vehicle. Once the position error estimate of GPS or GPS-DR data becomes significant, the tracking data captured by the in-vehicle vision based module can supplement the GPS-related data for minimizing errors in the vehicle's estimated position.

An embodiment contemplates a method of augmenting GPS data using an in-vehicle vision-based module. A vehicle position is determined utilizing position-related data obtained from a position module. A position error is estimated on a periodic basis. A determination is made whether the position error estimate exceeds a first predetermined error threshold. Tracking data is generated for the vehicle over a course of travel utilizing captured images from the in-vehicle vision based module. The tracking data is integrated with the position-related data to estimate the vehicle position in response to the position error estimate exceeding the first predetermined error threshold. A determination is made whether the position error estimate decreases below a second predetermined error threshold. The vehicle position is re-determined using only the position-related data without the in-vehicle vision based module when the position error estimate decreases below the second predetermined error threshold.

An embodiment contemplates an augmented vehicle positioning system. A vehicle-position module determines a vehicle position of a vehicle utilizing position-related data. The vehicle position module further determines a position error estimate that provides a confidence level of an accuracy of the vehicle position. An in-vehicle vision based module captures images over a path of travel of the vehicle for generating tracking data. A determination is made whether the position error estimation exceeds a first predetermined error threshold. The tracking data is integrated with the position-related data to estimate a current vehicle position when the position error exceeds the first predetermined error. The current vehicle position is re-determined using only the position-related data without the in-vehicle vision based module when the position error estimate is less than a second predetermined error threshold.

DETAILED DESCRIPTION

Figure 1:
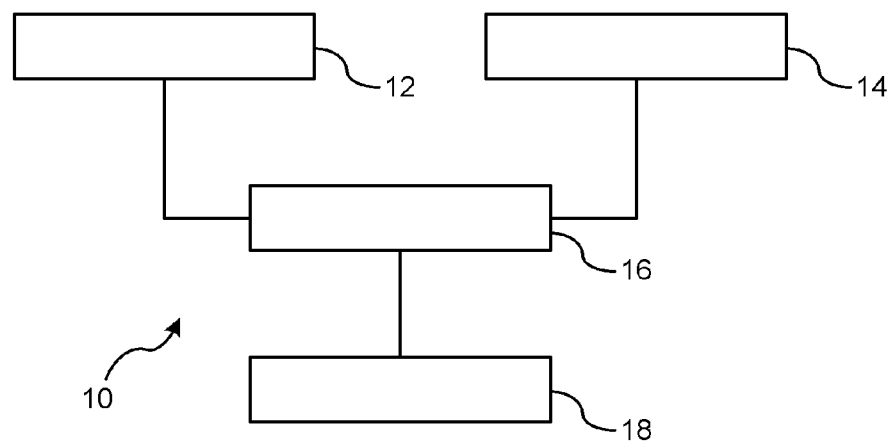
FIG. 1 is a block diagram of the vehicle positioning system.

There is shown in FIG. 1, a block diagram of the vehicle positioning system 10 for a host vehicle. The vehicle positioning system 10 includes an onboard Global Navigation Satellite System (GNSS) receiver 12 or other Global Positioning System (GPS) receiver. It should be understood that the term GNSS and GPS are used herein are interchangeable. A GNSS system includes a global positioning satellite constellation that includes at least 24 or more satellites orbiting the earth in a predetermined path of travel continuously transmitting time marked data signals. A GNSS receiver 12 operates by tracking line of sight signals. These receivers typically require at least four or more satellites to be continuously available in an unobstructed line of sight of a satellite receiver on a vehicle. The GNSS receiver 12 receives the transmitted data and uses this information to determine its absolute position. In viewing the earth in a two dimensional plane, each point on the earth is identified by two coordinates. The first coordinate represents latitude and the second coordinate represents a longitude. To determine a position in the two dimensional plane, at least three satellites are required as there are three unknowns, two position unknowns and the receiver clock timing error which also treated as an unknown. Some receivers may assume that the altitude stays the same for short duration such that position can be determined with only three satellites; however, if altitude is taken into consideration which is the case for most applications, then at least a minimum of four satellites are required to estimate an absolute position with a certain amount of error. By using four or more satellites, an absolute position in a three dimensional space can be determined that includes the height above and below the earth's surface (e.g., sea level).

Satellite receivers operate by tracking line of sight signals which requires that each of the satellites be in view of the receiver. By design, GNSS or other GPS systems ensure that on average, four or more satellites are continuously in the line of sight of a respective receiver on the earth; however, due to urban canyons (i.e., obstructions such as buildings), or driving next to a truck, a lower number of satellites may be in the line of sight, and even more so, obstructions may result in a lower number of satellites than that which is required to accurately determine the position of the satellite receiver.

The vehicle positioning system 10 further includes in-vehicle motion sensors 14 for detecting movement of the vehicle. The sensors 14 detect movement that includes, but is not limited to, vehicle yaw data, vehicle distance travelled, and vehicle pitch data. The vehicle yaw relates to the heading of the vehicle as it moves right-to-left or left-to-right. Vehicle pitch relates to an imaginary axis extending along a longitudinal plane of symmetry of the vehicle, and may be referred to as a nose up or nose down position. Such information may be used to determine a vehicle position based on its course of travel with respect to a vehicle position in the past. This is commonly referred to as a dead-reckoning technique. Dead reckoning involves an estimation of an entity's current position based upon a previously determined position. The current position is updated or advanced based on motion data such as sensed speeds over elapsed time and changes in yaw. GPS navigation devices may utilize the dead-reckoning technique as a backup to supplement speed and course heading when the GPS receiver is intermittently unable to receive GPS signals from the GPS satellites. This is hereinafter referred to as GPS-DR. However, the longer the duration that the GPS receiver fails to receive a GPS signal, the more error that will grow with respect to the calculated position determined by the dead reckoning technique. This is due to the in-vehicle sensors, specifically those that supply yaw data. If high precision sensors are not used to sense yaw, inaccuracies in the sensed data will accumulate faster over time thereby affecting the determination of the vehicle position using the dead-reckoning technique.

The vehicle positioning system 10 further includes a processor 16 for receiving GPS data and in-vehicle sensor data for determining a vehicle position. The processor 16 will receive the GPS data and in-vehicle sensor data and estimate a current vehicle position using the in-vehicle sensor data when the GPS signal are unavailable for updating the GPS unit. It should be understood that the processor 16 may integrated as part of a vehicle positioning module that may include the various positioning devices (e.g., GNSS/GPS devices).

The vehicle positioning system 10 further includes an in-vehicle vision based module 18. The in-vehicle vision based module 18 uses capture image devices directed forward of the vehicle for capturing images in a road of travel of the vehicle. Objects within a captured image typically get closer as the vehicle travels along the road. The in-vehicle vision based module 18 may further use capture image devices directed rearward of the vehicle for capturing images rearward of the vehicle. The term rearward as used herein may include the sides of the vehicle such as blind spots and any other non-forward direction. Objects captured by a rearward facing image capture device become more distanced as the vehicle travels along it path of travel.

Figure 2:
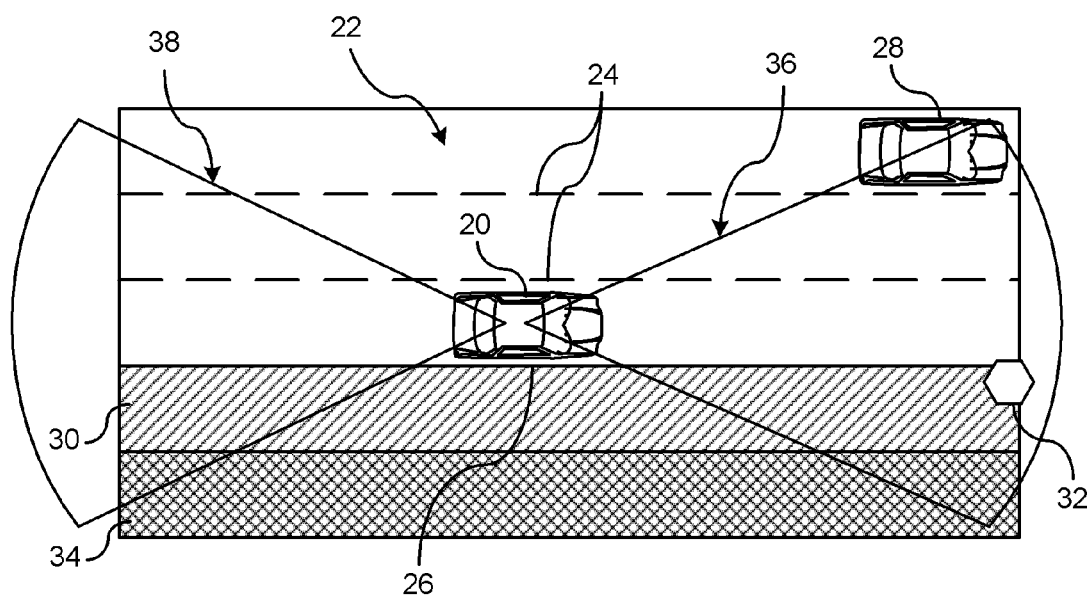
FIG. 2 is an exemplary illustration of regions captured by the in-vehicle vision based module

FIG. 2 shows an exemplary illustration of regions captured by the in-vehicle vision based module. A host vehicle 20 is shown traveling along a road 22. The road 22 contains lane markers 24 and a curb 26. Other vehicles 28 may travel in one or more of the lanes of the road 22. A sidewalk 30 is located adjacent road and may include objects such as a sign post 32. In addition, buildings 34 and other fixtures are located adjacent the sidewalk 30.

The in-vehicle vision based module includes a first capture image device that captures images in a region of interest forward of the host vehicle 36 and a second capture image device that captures images in a region of interest rearward 38 of the host vehicle. By capturing and recognizing objects of the road 22 in front and in back of the host vehicle 20, the vehicle position system 10 can improve the host vehicle's position of accuracy to a lane level accuracy, specifically when there is significant error in the GPS data or GPS-DR data.

As shown in FIG. 2, the captured images in the region of interest 36 forward of the vehicle may assist in identifying where the road 22 or a respective lane is located. Objects and features as detected in the region of interest 36 may allow for lane marker detection and road curb detection. Objects and features as detected outside the road but that are still captured within the region of interest 36 allow for road-side objection detection, building detection, and sidewalk detection. The detection of these objects and features as described above allow for greater accuracy when determining the position of the host vehicle 20 within the road. Similarly, objects in the region of interest 38 rearward of the host vehicle 20 may also be used to determine the position of the host vehicle 20 within the road 22, based on the identification and classification of similar objects and features.

Figure 3:
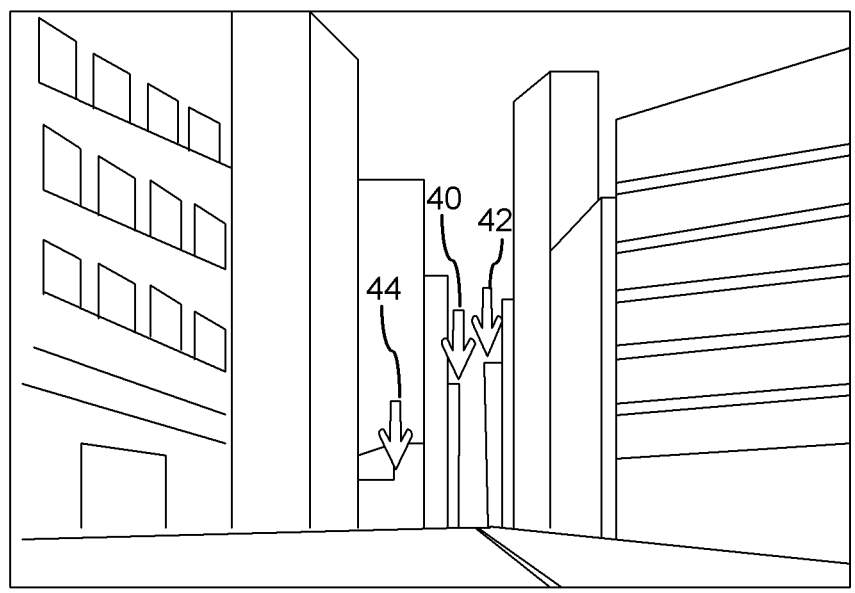
FIG. 3 is a graphical illustration of a captured image of an urban canyon at a starting point of analysis.
Figure 4:
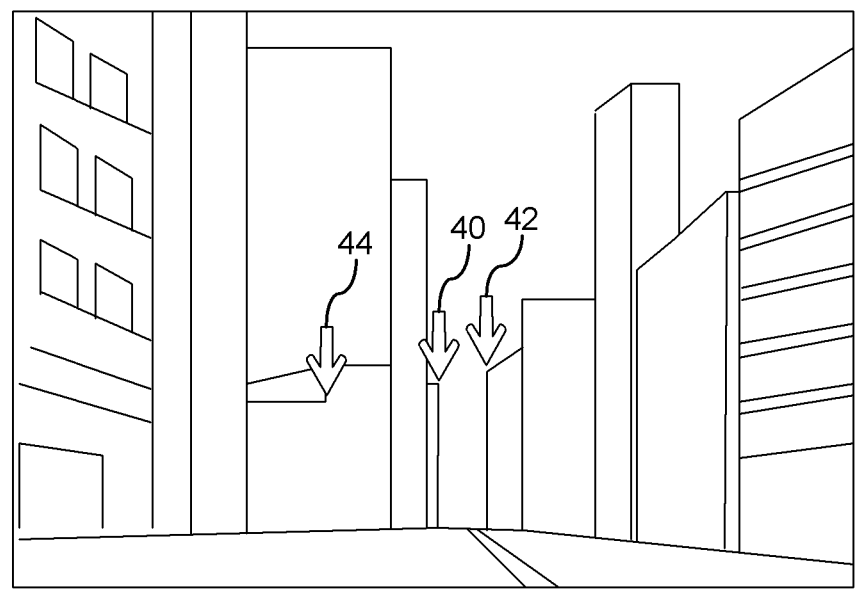
FIG. 4 is a graphical illustration of a captured image of an urban canyon after a traveled distance.

FIGS. 3 and 4 illustrate the images captured in the region of interest forward of the vehicle at different time periods. FIG. 3 illustrates a capturing image at a starting point of analysis. Building and other structures are commonly referred to as urban canyons which block GPS signals from reaching the GPS receiver of the host vehicle. FIG. 4 illustrates a captured image after driving a respective distance. Far-distance stationary points are tracked utilizing the corner of the buildings. The arrows markers 40 and 42 identify the corners of the buildings. Close-distance stationary points 44 are tracked utilizing the road-side features. Far-distance stationary point and close-distance stationary point pairs are selected and tracked over a duration of travel (i.e., between the images of FIG. 3 and FIG. 4). By identifying and tracking far-distance stationary points in the captured images over time, yaw and pitch estimations can be corrected. Moreover, by identifying and tracking close-distance stationary points in the captured images over time using stereo vision or shape-from-motion techniques, both yaw and distance estimation can be corrected.

Figure 5A:
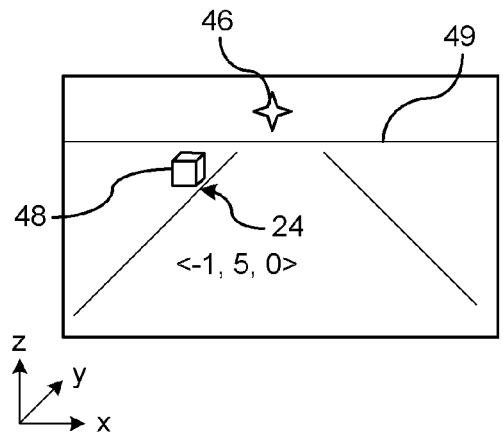
FIG. 5a is a representation of identified objects at a far distance.
Figure 5B:
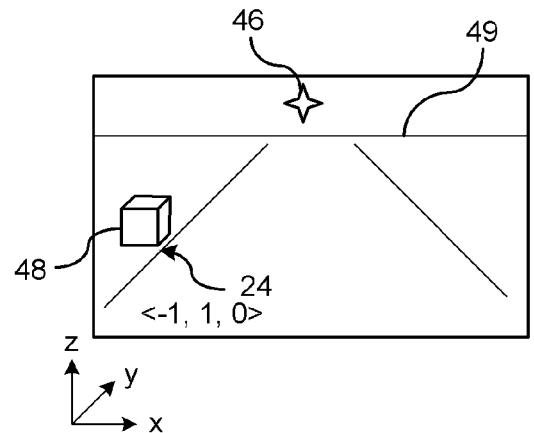
FIG. 5b is a representation of identified objects at a close distance.

Referring to FIGS. 5a and 5b, object 46 represents a far-distance stationary point. Feature points are determined through point selection and classification. Far-distance stationary points are identified using vanishing point identification such as an intersection of parallel lines. Alternatively, far-distance stationary points may be identified where the object does not move while the vehicle is traveling straight, has a rich texture or a high corner value, and is not located on a remote vehicle. A high corner value is one in which both a vertical edge and a horizontal edge has a smooth edge surface and each edge terminate at an intersection of the two edge surfaces.

Object 48 represents a close-distance stationary point. Feature points for close-distance stationary points are also identified using selection and classification. Close-distance stationary points also identified as features points which have a rich texture or a high corner value. In addition, close-distance stationary points find their correspondence in a next image frame using a corresponding matching method such as an optical flow matching or a SIFT matching. Optical flow is the pattern of apparent motion of objects, surfaces, and edges in a visual scene caused by the relative motion between an observer (an eye or a camera) and the scene. Sequences of ordered images allow the estimation of motion as either instantaneous image velocities or discrete image displacements. In Sift matching, key points of objects are first extracted from a set of reference images and stored in a database. A respective object is recognized in a new image by individually comparing each feature from the new image to those objects stored in the database and finding candidates having matching features based on Euclidean distance of respective feature vectors. In further determining which objects are close-distance stationary point pairs, respective points which do not move much in the image or on the moving object are excluded. This includes respective points which demonstrate abnormal motion with a stationary point assumption, or respective points on the detected vehicle or pedestrians. Moreover points on the ground such as a bottom corner of the building or a lane marker corner may be identified through camera calibration which utilizes a stationary ground assumption technique. In utilizing a flat ground assumption technique, a three dimensional coordinate system (x, y, z) is utilized. A flat ground plane is determined through each captured image frame by setting the one of the planes (e.g., z-direction) as the ground plane. The ground plane may be identified by lane markers or other features of the road. By tracking close-stationary points relevant to a common ground plane (e.g., flat ground plane) between images, deviation of the vehicle tracking with respect to only the x-direction and the y-direction may be estimated. Deviation in the x-direction relates to the yaw of the vehicle. Deviation in the y-direction relates to distance. As a result of tracking the close-by stationary points, corrections to yaw estimations and distance estimations may be determined. Alternatively, yaw estimation and distance estimation may be determined using a shape-from motion technique.

In addition, in tracking far-distance stationary points in a captured image over a duration of travel, both yaw estimation and pitch estimation may be determined. Pitch relates to a movement of the vehicle along the z-direction. Object 46 as shown in FIGS. 5*a* and 5*b* would be tracked over the duration of travel to determine if corrections should be made with respect to either the yaw estimation or the pitch estimation. Moreover, correction of a roll estimation may be determined utilizing the horizon 49, which is the line were the road/land meets the sky. The in-vehicle vision based module may estimate errors associated with its tracking data and provide an error estimation to the vehicle position module for determining the reliability of the tracking data.

Figure 6:
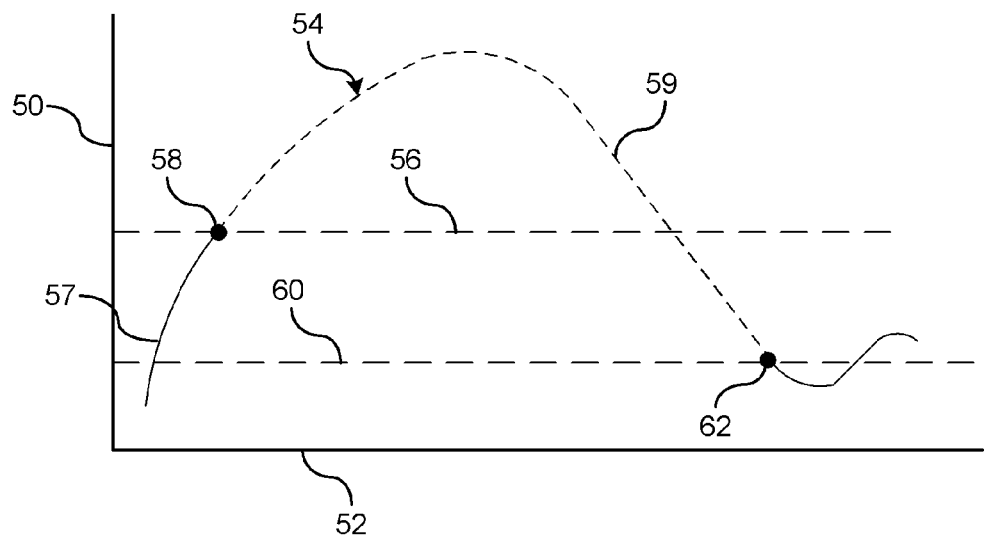
FIG. 6 is an exemplary graph illustrating position error tracking for enabling a vision aided operation.

FIG. 6 illustrates a graph for determining when the tracking data obtained from the in-vehicle vision based module is used to augment the GPS data and in-vehicle sensor data for re-correcting the current vehicle position. As described earlier, the in-vehicle sensor data is used to supplement GPS data when the GPS signals from the GPS satellites become unavailable after a period of time. GPS or GPS-DR data may also become unstable if the in-vehicle sensor data is not recalibrated or re-initialized after a duration of time. To determine when the GPS data or GPS-DR data requires augmentation, an estimated position error is compared to thresholds to determine when augmentation is required. In FIG. 6, a graph is shown where the y-axis is represented in terms of position error estimate 50, and the x-axis is represented in terms of time 52. The line graph 54 is represents the position error estimate for the host vehicle while driving over a duration of time.

A first predetermined error threshold is shown at 56. Segment 57 represents the portion of the position error estimation from the initiation of the position error tracking to a time when the first predetermined error threshold is reached. During segment 57, the vehicle position system utilizes only the GPS or GPS-DR data to estimate the current vehicle position. At the time the position error tracking exceeds the first predetermined error threshold at point 58, augmentation of the GPS or GPS-DR data utilizing in-vehicle vision based tracking is initiated. At this time, GPS or GPS-DR data is determined to have too much error or is reaching a point where the estimated vehicle position of the host vehicle is becoming too inaccurate. Therefore, the tracking data determined by the in-vehicle vision based tracking module is integrated with GPS or GPS-DR data to correct the yaw, pitch, and distance information. Segment 59 of the segment of the position error estimate where the vision aided operation is utilized. This vision aided operation will continue until position tracking estimate decreases below a second predetermined error threshold 60. As position error estimate 54 decreases below point 62, the vision aided operation of supplementing the GPS or GPS-DR data may be discontinued. Vehicle position estimation will utilize only the GPS or GPS-DR data until the position error tracking estimate 54 exceeds the first predetermined error threshold 56 at which time the GPS or GPS-DR data will be augmented with the tracking and correction data provided by the in-vehicle vision based module. Preferably, the in-vehicle vision based module only initiates capturing images and vision tracking when the first predetermined error threshold is exceeded. This conserves memory allocation and processing power. Alternatively, the path of travel by the vehicle may be continuously tracked by the in-vehicle vision based module; however, the tracking data is only utilized when the first predetermined error threshold is exceeded.

It is also noted that the first predetermined error threshold is greater than the second predetermined error threshold. This assures that utilization of the vision aided operation is maintained until it is certain that the GPS or GPS-DR data is stable in estimating vehicle positioning with acceptable errors. Alternatively, the first predetermined error threshold may be less than the second predetermined error threshold, or the first predetermined error threshold may be equal to the second predetermined error threshold without deviating from the scope of the invention.

While certain embodiments of the present invention have been described in detail, those familiar with the art to which this invention relates will recognize various alternative designs and embodiments for practicing the invention as defined by the following claims.

What is claimed is:

1. A method of augmenting GPS data using an in-vehicle vision-based module, the method comprising:
   determining a vehicle position utilizing position-related data obtained from a position module by a processor;

estimating a position error on a periodic basis by the processor;

determining whether the position error estimate exceeds a first predetermined error threshold;

generating tracking data for the vehicle over a course of travel utilizing captured images from the in-vehicle vision based module;

integrating the tracking data with the position-related data to estimate the vehicle position in response to the position error estimate exceeding the first predetermined error threshold;

determining whether the position error estimate decreases below a second predetermined error threshold; and re-determining the vehicle position using only the position-related data when the position error estimate decreases below the second predetermined error threshold.

2. The method of claim 1 wherein the vehicle position module utilizes position-related data obtained from a GPS-based device.

3. The method of claim 1 wherein the vehicle position module utilizes position-related data obtained from a GPS-dead reckoning based device.

4. The method of claim 1 wherein the first predetermined location error threshold is greater than the second predetermined location error threshold.

5. The method of claim 1 wherein the in-vehicle vision based module uses a feature identification and classification function for identifying an object and classifying the object as a stationary object from the tracking data.

6. The method of claim 5 wherein the stationary objects are classified as far-distance stationary objects and close-distance stationary objects.

7. The method of claim 6 wherein the far-distance stationary objects are tracked over time for correcting yaw estimation.

8. The method of claim 6 wherein the far-distance stationary objects are tracked over time for correcting pitch estimation.

9. The method of claim 6 wherein the far-distance stationary objects are tracked over time for correcting roll estimation.

10. The method of claim 6 wherein the close-distance stationary objects are tracked over time for correcting yaw estimation.

11. The method of claim 6 wherein the far-distance stationary objects are tracked over time for correcting distance estimation.

12. The method of claim 10 wherein the close-distance stationary objects are tracked utilizing a flat ground assumption technique.

13. The method of claim 1 wherein the path of travel of the vehicle is continuously tracked by the in-vehicle vision based module.

14. An augmented vehicle positioning system comprising:
a vehicle-position module for determining a vehicle position of a vehicle utilizing position-related data, the vehicle position module further determining a position error estimate that provides a confidence level of an accuracy of the vehicle position; and an in-vehicle vision based module for capturing images over a path of travel of the vehicle for generating tracking data;

wherein a determination is made whether the position error estimation exceeds a first predetermined error threshold, wherein the tracking data is integrated with the position-related data to estimate a current vehicle position when the position error exceeds the first predetermined error, and wherein the current vehicle position is re-determined using only the position-related data when the position error estimate is less than a second predetermined error threshold.

15. The augmented vehicle positioning system of claim 14 wherein the vehicle position module determines a GPS-related position of a vehicle utilizing GPS data obtained from GPS satellites.

16. The augmented vehicle positioning system of claim 15 further comprising at least one vehicle motion sensor for obtaining vehicle motion data, wherein the vehicle position module provides dead-reckoning functionality for estimating the GPS-related position using the vehicle motion data in cooperation with the GPS data, the vehicle position module updating the GPS-related position using the dead reckoning functionality during periods when GPS-satellite reception is limited.

17. The augmented vehicle positioning system of claim 16 wherein the in-vehicle vision based module identifies objects from the captured images, and wherein the in-vehicle vision based module classifies the object as a stationary object for tracking.

18. The augmented vehicle positioning system of claim 17 wherein the in-vehicle vision-based module classifies the stationary objects as far-distance stationary objects and close-distance stationary objects.

19. The augmented vehicle positioning system of claim 18 wherein the far-distance stationary objects are tracked over time for correcting a yaw and pitch estimation in the GPS-related position.

20. The augmented vehicle positioning system of claim 18 wherein the close-distance stationary objects are tracked over time for correcting a yaw and distance estimation in the GPS-related position.

21. The augmented GPS-related vehicle positioning system of claim 14 wherein the first predetermined error threshold is greater than the second predetermined error threshold.

22. The augmented vehicle positioning system of claim 21 wherein the in-vehicle vision module includes vision devices capturing images forward of the vehicle.

23. The augmented vehicle positioning system of claim 21 wherein the in-vehicle vision module includes vision devices capturing images rearward of the vehicle.

* * * * *